W. S. SUTTON.
COMMUTATOR FOR ELECTRIC MACHINES.
APPLICATION FILED SEPT. 23, 1907.
996,895.
Patented July 4, 1911.
2 SHEETS—SHEET 1.
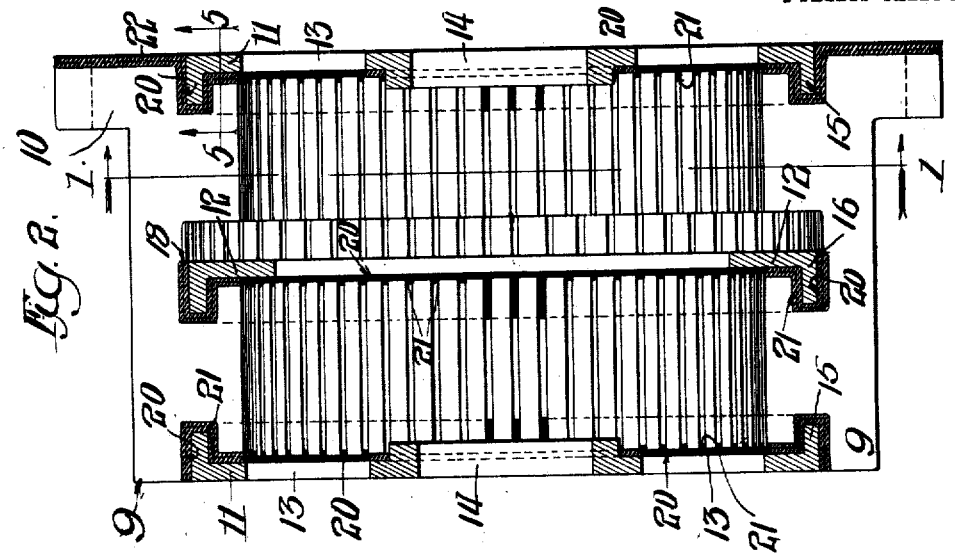
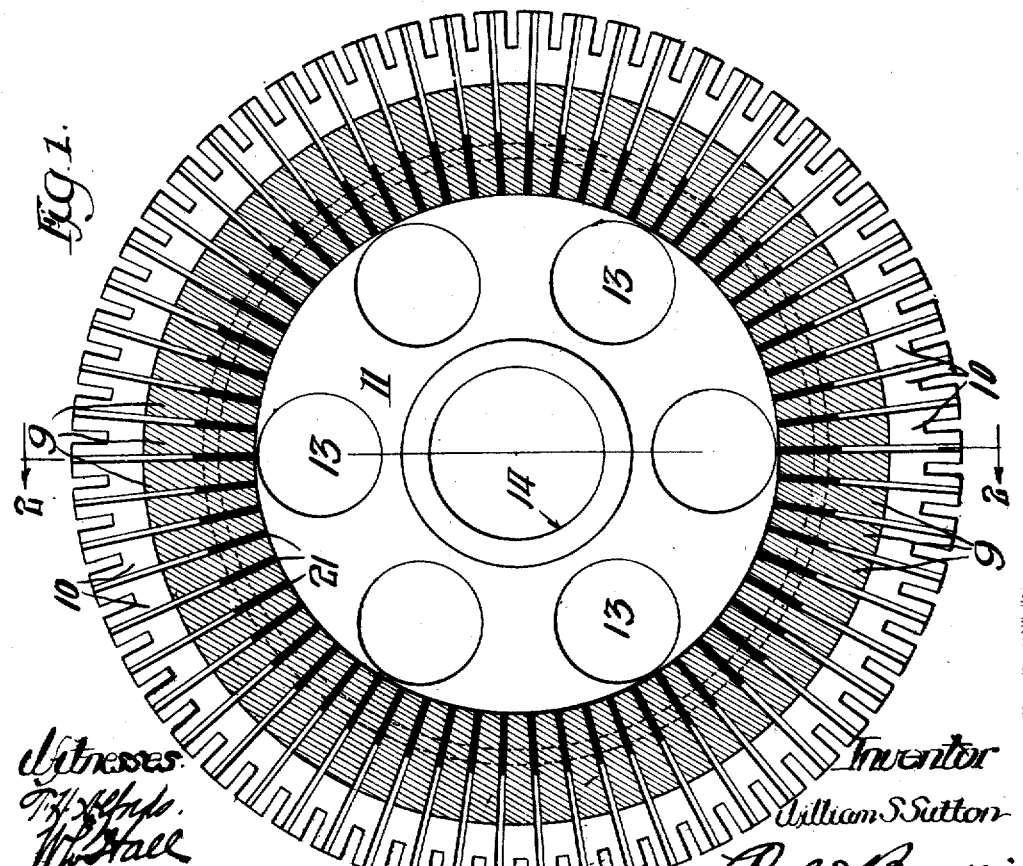

W. S. SUTTON.
COMMUTATOR FOR ELECTRIC MACHINES.
APPLICATION FILED SEPT. 23, 1907.
996,895.
Patented July 4, 1911.
2 SHEETS—SHEET 2.
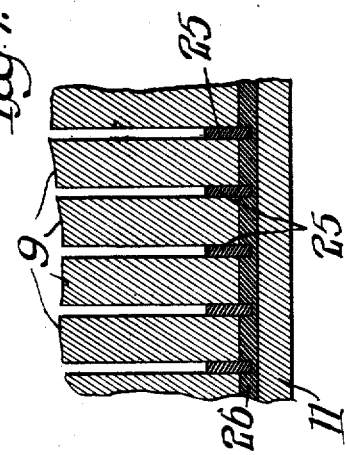
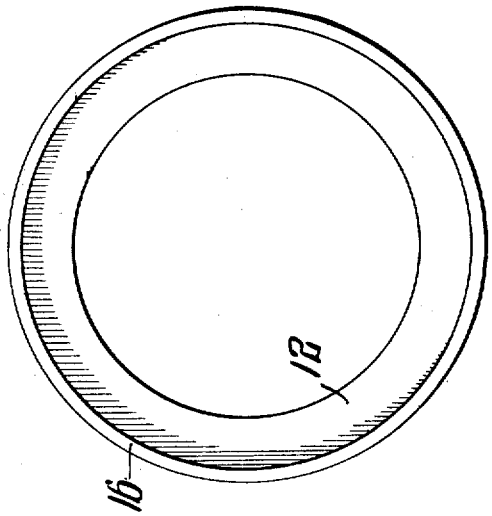
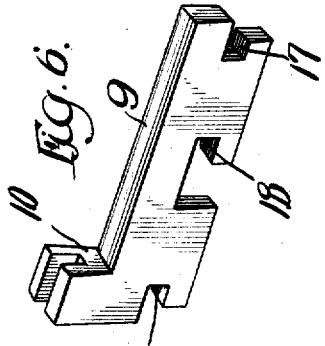
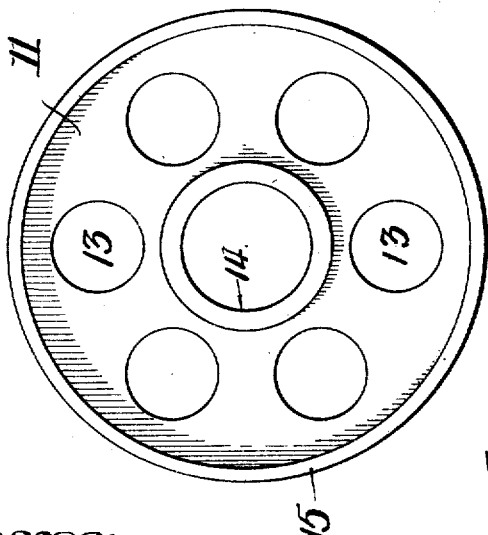
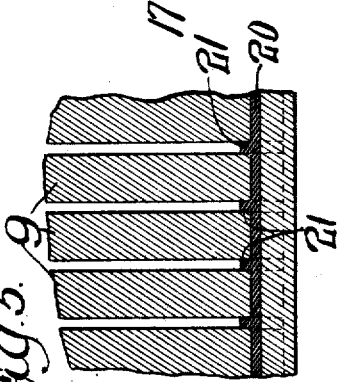
Witnesses:
T. H. Alfred
W. W. Hall
Inventor
William S. Sutton
by Poole & Brown
Attys

UNITED STATES PATENT OFFICE.

WILLIAM S. SUTTON, OF MADISON, WISCONSIN, ASSIGNOR TO ALLIS-CHALMERS COMPANY, A CORPORATION OF NEW JERSEY.

COMMUTATOR FOR ELECTRIC MACHINES.

996,895.　　　　　Specification of Letters Patent.　　Patented July 4, 1911.

Application filed September 23, 1907. Serial No. 394,055.

*To all whom it may concern:*

Be it known that I, WILLIAM S. SUTTON, a citizen of the United States, and a resident of Madison, in the county of Dane and State of Wisconsin, have invented certain new and useful Improvements in Commutators for Electric Machines; and I do hereby declare that the following is a full, clear, and exact description thereof, reference being had to the accompanying drawings, and to the letters of reference marked thereon, which form a part of this specification.

This invention relates to improvements in commutators for electric machines, and the invention consists in the matters hereinafter set forth, and more particularly pointed out in the appended claims.

Among the objects of the invention is to provide an improved commutator constructed and arranged to maintain the commutator bars cool and to overcome forces tending to displace the bars either under the force of centrifugal action or that exerted by retaining devices heretofore employed to hold the commutator bars in place, and without the use of outside retaining rings.

A further object of the invention is to produce a commutator possessing these advantages which is exceedingly simple and relatively light in construction, which is strong and durable and which is economical to manufacture.

As shown in the drawings:—Figure 1 is a transverse section of a commutator made in accordance with my invention, taken on line 1—1 of Fig. 2. Fig. 2 is an axial section thereof, taken on line 2—2 of Fig. 1. Fig. 3 is a side elevation of one of the end supporting rings or members of the commutator. Fig. 4 is a side elevation of an intermediate retaining or supporting member. Fig. 5 is a detail section, taken on line 5—5 of Fig. 2. Fig. 6 is a perspective view of one of the commutator bars. Fig. 7 is a fragmentary section illustrating a modification, said section being taken in the same plane as Fig. 5.

A commutator embodying the invention embraces, in general terms, a plurality of internal supporting members which preferably assume the general form of rings, and a plurality of commutator bars arranged in the usual circular relation about and supported on said supporting members and affixed thereto by an insulating bonding material which is applied to the parts at the point where they are joined in assembled relation and which is thereafter fused over the surfaces of the parts at said points and solidified to constitute a bond to rigidly connect the parts and at the same time to electrically insulate the commutator bars from their support. Thus said members of the commutator are reliably held or fastened together without imposing any restraining pressure on the bars, which pressure, in commutators heretofore made employing internal retaining rings, acts in the direction of the longitudinal axes of the bars with a tendency to displace the central parts of the bars and thus destroy the exterior cylindric face of the commutator presented to the action of the brushes.

A further feature of the improved commutator lies in spacing the commutator bars a distance apart and thereby avoiding the necessity of insulation between the bars except at the points where the bars are bonded to the supporting rings or members, thus permitting the commutator bars to be separated by air gaps and to be reliably supported at longitudinally separated points by the use of a very simple and efficient construction. The commutator bars are therefore insulated principally by the air gaps between the bars, and said air gaps permit circulation of air therebetween, the bars acting as vanes to produce such circulation.

Referring now more specifically to the several features of construction embodied in said improved commutator, with reference to one approved design illustrated in the drawings, the same are made as follows: 9, 9 designate the several commutator bars provided with any preferred form of wire attaching lugs 10, 10; and 11, 11 and 12 designate internal supporting and retaining members which have the general form of rings as herein shown. The outer supporting members 11 are formed to provide a plurality of openings 13, 13 to admit air to the interior of the commutator and are provided also with central hubs or bearing portions 14 by which said end members are mounted on the armature shaft or other shaft of the electrical machine. When the commutator bars are short the two end rings or members will ordinarily be sufficient to support and retain the commutator bars. When the commutator is made of greater length, one or more of the intermediate retaining rings 12 will be employed. The said end and intermediate members or rings are formed with annular laterally extending flanges, 15 and 16, respectively, which enter notches 17, 17 and 18 in the commutator bars, the notches 17 opening outwardly toward the ends of the bars, and the intermediate notches 18 being specially shaped or fashioned to receive the intermediate retaining ring or rings. As herein shown, said intermediate notches are formed at their mouths of a width to receive the flanges and the bodies of the intermediate rings and are under-cut at the ends longitudinally of the bars to receive the flanges of the intermediate ring when in its final assembled position. Thus an interlocking connection is formed like the interlocking connection between the notched ends of the bars and ring flanges. The said supporting and retaining members or rings may be formed from sheet metal by a simple swaging process, or may be made of cast-metal, as preferred. Said intermediate rings are made of a radial width only sufficient to provide the necessary strength inasmuch as it is desirable, for the purpose of ventilation, to obstruct the interior of the commutator as little as practicable. The flanges of the supporting and retaining members interlocking as they do with the commutator bars afford an exceedingly strong connection between said parts to overcome the effect of the centrifugal force tending to throw the bars outwardly, thus contributing greatly toward the strength of the connections between the parts of the commutator. The notches in the commutator bars to receive the interlocking parts of the retaining members are extended a sufficient distance into the bodies of said bars, which widen toward their outer sides to provide wide surface contact with the bonding material as is consistent with the required strength of the bars and other structural conditions.

The bars are held from endwise and lateral displacement by a bonding material which is fused on the surfaces of the parts at their points of connection, thus rigidly binding said parts together without the use of mechanical means, as clamps, bolts, screws and the like. The said bonding material possesses high insulating properties whereby it serves also as means to insulate the bars from the supporting and retaining members. The insulating bonding material, such as enamel, is applied to the exterior surfaces of the flanges of the supporting and retaining rings or members, and to the inner faces of the end members and to one face of the intermediate member and is also applied to the corresponding faces of the commutator bars at the notches 17 and 18. The parts are assembled in any suitable assembling device constructed to hold the commutator bars spaced the desired distance apart and to hold the retaining rings or members in proper relation to said commutator bars. The parts are locked in this relation and are placed in an oven to fuse the bonding material to the proper consistency so that it will properly flow over the surfaces of the parts to be joined. Thereafter the assembled device is removed from the annealing or fusing oven to allow the bonding material to set or harden in the mass or layer form which it has assumed under heat. The layers of the bonding material thus formed between the opposing faces of the commutator bars and rings or members are designated by the reference numeral 20 in Figs. 2 and 5, said layers being fused on said faces and constituting a connecting bond between the parts. The bonding material or enamel is applied to the parts in such quantities that, when under heat, it flows between the separated commutator bars and against the adjacent side faces of said bars a short distance to form rib-like projections 21 which are united to the bars and thus increase the area of surface adhesion between the bonding layer and the commutator bars. The section shown in Fig. 2 is taken in a plane that cuts the said ribs 21 of the bonding material, and said ribs are distinguished from the layer of bonding material between the opposing faces of the commutator bars and rings by dotted lines in Fig. 2. The bonding material may also be applied to the inner ends of the commutator bars or the ends thereof, when in place in the electrical machine, which are adjacent to the armature, to provide a layer 22 of the bonding material or enamel, which serves both the purposes of bonding or uniting the ends of the commutator bars and the lugs 10 thereof, and also of providing a complete layer of insulation between the armature and the commutator, as will be clear by an inspection of Fig. 2. For the sake of clearness of illustration of the air gaps between the bars, the insulation 22, radially beyond the end rings or members, is omitted from Fig. 1.

In Fig. 7 I have shown the commutator bars 9 as being spaced by spacing blocks 25, which are made of any suitable insulating material. Said spacing blocks are shown as extending beyond the ends of said bars and are embedded in the layer 26 of the bonding or enameling material between the ends of said bars and the supporting and retaining ring or member 11. Said spacing blocks may be made of mica or may be made of enamel, and the side faces of the commutator bars adjacent or opposed to the faces of the blocks are supplied with the enameling or bonding material, so that said blocks, after the fusing and hardening operation, are bonded to said bars as well as the supporting and retaining members.

From the foregoing it will be seen that I have provided an exceedingly simple, strong and efficient commutator construction which possesses high insulating efficiency, and one which may be at all times maintained suitably cool by the circulation of air between the commutator bars. Such circulation of air may be that naturally produced by the motion of the commutator, or such circulation may be a forced circulation produced by a suitable air forcing device within or communicating with the interior of the device. It will also be observed that the commuta or bars are held or fixed to the supporting and retaining rings or members by means avoiding any retaining pressure on the bars endwise thereof such as tends to spring the bars at their centers and thereby destroy the continuity of the cylindric face of the commutator. The simple retaining means provided permit the commutator to be built with light commutator bars, while avoiding the necessity of using external bands or retaining devices. Thus the entire length of the cylindric face of the commutator is available to the brushes. There being no insulation between the bars except at their points of joining with the supporting and retaining rings, the defect of relative shifting of the bars and insulation heretofore observed in commutators, due to differential expansion and contraction of the bars and insulation is not present. Thus the insulation herein provided is not disturbed by expansion and contraction of the commutator bars.

It is to be understood that the essential features of the invention may be embodied in constructions differing in their details from the construction herein shown and I do not restrict myself, therefore to such details except as hereinafter made the subject of specific claims.

I claim as my invention:—

1. In a commutator, the combination of an internal supporting structure having an interior space with outlets, a plurality of spaced commutator bars supported thereon, the spaces between said bars communicating with the space within the supporting structure and a fusible adhesive bond of insulating material between said bars and said supporting structure.

2. In a commutator, the combination of a plurality of spaced supporting rings provided with flanges, a plurality of spaced commutator bars provided with notches into which the flanges of the supporting rings extend, and a bond of fusible insulating material joining said bars to said supporting rings and insulating them therefrom.

3. In a commutator, the combination of a plurality of spaced supporting rings provided with holes connecting the space between such rings with the atmosphere, a plurality of spaced commutator bars arranged around the peripheries of said rings, the spaces between said bars communicating with space between said rings, and insulating material between the adjacent surfaces of said rings and bars.

4. In a commutator, the combination of a plurality of flanged supporting rings, a series of commutator bars arranged around the peripheries of said rings and provided with notches into which the flanges of said supporting rings extend, and a hardened plastic insulating material located between and adhering to the adjacent surfaces of said rings and bars.

5. In a commutator, the combination of a plurality of spaced supporting rings having flanges, a plurality of commutator bars arranged around the peripheries of said rings and having notches into which the flanges of said supporting rings extend, and adhesive means for holding said rings and bars in proper relative position.

6. In a commutator, the combination of a plurality of spaced supporting rings provided with flanges and having openings connecting the space between them with the atmosphere, a plurality of spaced commutator bars provided with notches into which the flanges of said supporting rings extend, the spaces between said bars communicating with the spaces between said rings, and a bond of insulating material mechanically connecting but electrically insulating said bars and said rings.

7. In a commutator, the combination of a plurality of spaced supporting rings provided with flanges, a coating of hardened plastic insulating material over the flanged portions of said rings, and a series of commutator bars having notches arranged to receive said flanged portions of the supporting rings, portions of the commutator bars being set into said coating of insulating material.

8. In a commutator, the combination of a plurality of spaced supporting rings having flanges, a series of commutator bars arranged around the peripheries of said rings and having notches into which the flanges of the supporting rings extend, and hardened plastic insulating material between the adjacent surfaces of said bars and rings and alone holding said parts in proper relative position.

9. In a commutator, the combination of a plurality of spaced supporting rings having flanges, a plurality of commutator bars arranged around the peripheries of said rings and having notches into which the flanges of said supporting rings extend, and means for holding said rings and bars in proper relative position while leaving the bars free from any longitudinal stresses due to clamping pressure.

In testimony, that I claim the foregoing as my invention I affix my signature in the presence of two witnesses, this 7th day of September A. D. 1907.

WILLIAM S. SUTTON.

Witnesses:
G. S. McConochie,
Emerson Ela.